US009819470B2

(12) United States Patent
Fodor et al.

(10) Patent No.: US 9,819,470 B2
(45) Date of Patent: Nov. 14, 2017

(54) METHOD AND ARRANGEMENT FOR INTERFERENCE MITIGATION

(75) Inventors: Gábor Fodor, Hässelby (SE); Muhammad Kazmi, Bromma (SE); Yi-Pin Eric Wang, Fremont, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 9 days.

(21) Appl. No.: 14/402,475

(22) PCT Filed: May 22, 2012

(86) PCT No.: PCT/SE2012/050551
§ 371 (c)(1),
(2), (4) Date: Nov. 20, 2014

(87) PCT Pub. No.: WO2013/176589
PCT Pub. Date: Nov. 28, 2013

(65) Prior Publication Data
US 2015/0139004 A1    May 21, 2015

(51) Int. Cl.
*H04L 5/00* (2006.01)
*H04J 11/00* (2006.01)
(Continued)

(52) U.S. Cl.
CPC ........ *H04L 5/0062* (2013.01); *H04J 11/0036* (2013.01); *H04L 5/14* (2013.01);
(Continued)

(58) Field of Classification Search
None
See application file for complete search history.

(56) References Cited

U.S. PATENT DOCUMENTS

2004/0259561 A1   12/2004   Stewart et al.
2008/0310329 A1   12/2008   Sun et al.
(Continued)

FOREIGN PATENT DOCUMENTS

KR    WO 2011065763 A2 *   6/2011   ........... H04B 7/0434
WO       2011124015 A1       10/2011

OTHER PUBLICATIONS

International Search Report and Written Opinion dated Feb. 26, 2013 for International Application Serial No. PCT/SE2012/050551, International Filing Date May 22, 2012 consisting of 11-pages.
(Continued)

*Primary Examiner* — Faruk Hamza
*Assistant Examiner* — Cassandra Decker
(74) *Attorney, Agent, or Firm* — Christopher & Weisberg, P.A.

(57) ABSTRACT

A method in a network node for assisting a first user equipment in interference mitigation. The network node is comprised in a cellular communications network. The cellular communications network further comprises the first user equipment and a second user equipment. The second user equipment causes interference to the first user equipment when at least one of the first user equipment and second user equipment communicate by using Device-to-Device communication. The network node obtains information about the receiver of the first user equipment. The network node then determines one or more parameters required by the first user equipment for mitigating the interference. The parameters relate to the obtained information and to the interfering second user equipment. The network node then sends the one or more parameters to the first user equipment thereby assisting the first user equipment to mitigate interference caused by the second user equipment.

46 Claims, 5 Drawing Sheets

(51) Int. Cl.
*H04L 5/14* (2006.01)
*H04W 24/08* (2009.01)
*H04W 72/08* (2009.01)
*H04W 72/04* (2009.01)

(52) U.S. Cl.
CPC ......... *H04W 24/08* (2013.01); *H04W 72/082* (2013.01); *H04W 72/0406* (2013.01)

(56) References Cited

U.S. PATENT DOCUMENTS

| | | | | |
|---|---|---|---|---|
| 2010/0296480 | A1* | 11/2010 | Nouda | H04J 11/00 370/330 |
| 2011/0077017 | A1* | 3/2011 | Yu | H04L 5/0007 455/452.1 |
| 2011/0282989 | A1 | 11/2011 | Geirhofer et al. | |
| 2012/0044815 | A1 | 2/2012 | Geirhofer et al. | |
| 2012/0051303 | A1 | 3/2012 | Dhanda et al. | |
| 2012/0120884 | A1* | 5/2012 | Yu | H04B 7/0426 370/329 |
| 2012/0140690 | A1* | 6/2012 | Choi | G01S 19/03 370/311 |
| 2012/0243431 | A1* | 9/2012 | Chen | H04W 72/0406 370/252 |
| 2013/0083743 | A1* | 4/2013 | Koo | H04B 7/0456 370/329 |
| 2013/0272196 | A1* | 10/2013 | Li | H04W 72/044 370/328 |
| 2015/0023316 | A1* | 1/2015 | Ko | H04L 5/0032 370/330 |

OTHER PUBLICATIONS

Klaus Doppler et al.: "Device-to-Device Communication as an Underlay to LTE-Advanced Networks", IEEE Communications Magazine, IEEE Service Center, Piscataway, NJ, US, vol. 47:12, Dec. 11, 2009 (Dec. 11, 2009), 42-49, XP011285852, ISSN: 0163-6804, DOI: 10.1109/MCOM.2009.5350367 consisting of 8-pages.

Gábor Fodor et al.: "Design Aspects of Network Assisted Device-to-Device Communications", IEEE Communications Magazine, IEEE Service Center, Piscataway, NJ, US, vol. 50:3, Mar. 5, 2012 (Mar. 5, 2012), pp. 170-177, XP011429640, ISSN: 0163-6804, DOI: 10.1109/MCOM.2012.6163598 consisting of 8-pages.

* cited by examiner

METHOD AND ARRANGEMENT FOR INTERFERENCE MITIGATION

TECHNICAL FIELD

Embodiments herein relate to a base station, a first user equipment and methods therein. In particular, it relates to assisting in interference mitigation and mitigating interference.

BACKGROUND

Communication devices such as User Equipments (UEs) are also known as e.g. terminals, mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, laptops, or surf plates with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or Pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations. In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies. The 3GPP LTE radio access standard has been written in order to support high bitrates and low latency both for uplink and downlink traffic. All data transmission is in LTE controlled by the radio base station.

D2D Communication

In cellular network assisted Device-to-Device (D2D) communications, also referred to as D2D communications as a cellular underlay, user equipments in the vicinity of each other typically less than a few 10 s of meters but sometimes up to a few hundred meters, can establish a direct radio link, also referred to as a D2D bearer. While user equipments communicate direct over the D2D bearer, they also maintain a cellular connection with their respective serving base station. In this way the cellular RAN can assist and supervise the user equipments in allocating time, frequency and code resources for the D2D bearer. Also, the cellular RAN controls mode selection, meaning that the cellular RAN decides whether the D2D pair should use the direct link or communication should take place via the base station. The RAN also sets the maximum power level that the D2D pair may use for the D2D bearer.

Thus the basic rationale for network assisted D2D communications is to take advantage of the short distances between user equipments, reuse cellular spectrum and at the same time to protect the cellular layer from potentially harmful interference caused by the D2D bearer.

Sounding Reference Signals and Demodulation Reference Signals in LTE Advanced Systems In LTE and LTE-Advanced systems, reference signals are designed to aid channel estimation at a receiver. Obtaining information about a wireless channel is useful for different purposes such as allowing coherent demodulation of transmitted symbols and making frequency channel dependent scheduling decisions. In the LTE uplink, two Reference signals are defined, the DeModulation Reference Signal (DMRS) and the Sounding Reference Signal (SRS).

The DMRS in LTE is associated with both the Physical Uplink Shared Channel (PUSCH) also referred to as the data channel, and the Physical Uplink Control Channel (PUCCH) also referred to as the control channel. This is to facilitate the coherent demodulation of both data and control signals in the resource blocks that the user equipment is actually transmitting. The SRS is transmitted by the user equipment within a bandwidth that is greater than the currently allocated bandwidth for this user equipment. In this way the base station has knowledge about channels that are currently not used by the user equipment which is useful for subsequent scheduling decisions at the base station.

In general, the dynamic estimation of the channel regarding frequency response, at the receiver is typically aided by such reference signals, sometimes also called pilots or pilot signals. The basic idea of using such pilot signals is to rely on transmitted symbols that are known at the receiver.

Interference Suppression and Interference Cancellation by LTE Advanced UEs

A communication link in a cellular communications network may be subject to different types of interference. First, the multipath environment results in distortion to the transmitted signal, giving rise to intersymbol interference. Intersymbol interference is a form of distortion of a signal in which one symbol interferes with subsequent symbols. Second, spatial multiplexing such as single-user or multi-user Multiple Input Multiple Output (MIMO) introduces spatial-multiplexing interference. Spatial multiplexing is a transmission technique in MIMO wireless communication to transmit independent and separately encoded data signals from each of the multiple transmit antennas. Third, due to frequency reuse, intercell interference may have an impact on link performance. Advanced receivers exploit interference signal structure and statistics to mitigate or reduce performance degradation.

For example, a linear Minimum-Mean-Squared-Error (MMSE) or Interference Rejection Combiner (IRC) receiver can alleviate interference by exploiting the spatial and/or temporal correlations in an interference signal. This may be thought of as a form of receiver beamforming, using the receiver degree of freedom, i.e. number of receive antennas, number of fingers in the case of CDMA system, etc., to suppress interference. It does not need much information about the interfering signal. In this type of receiver, interference spatial and temporal correlations may be estimated blindly, i.e. without knowing anything about the interfering signal. However, it is very helpful if the receiver knows the time interval in which the interference characteristics stay approximately the same, so that it can obtain and update interference correlations accordingly.

Yet, a more significant performance improvement may be achieved by an advanced receiver that fully exploits the interference signal structure. For example, if the transport format, e.g. modulation format and coding scheme, and reference signal, e.g. pilot symbols, see the previous section on reference/pilot signals, used by an interfering signal is known to the receiver, the receiver may attempt to detect the interfering signal and then cancel it based on the detected signal. Examples for this kind of receiver include post-decoding Successive Interference Cancellation (SIC) receiver, post-decoding Parallel Interference Cancellation (PIC) receiver, and Turbo Interference Cancellation (Turbo-IC) receiver, etc. These interference cancellation receivers may also include MMSE, e.g. MMSE-SIC, MMSE-PIC, etc.

Interference cancellation by these advanced receiver structures may lead to the elimination of the interference, which in some cases the interference is completely cancelled, whereas in other cases the impact of interference on the useful signal is reduced.

A problem may be exemplified in the following scenario, in which it is assumed that D2D communication uses UL cellular resources, i.e. UL spectrum in an Frequency-division duplexing (FDD) system or UL time slots in a Time-Division Duplex (TDD) system. FDD, TDD and half duplex FDD (HD-FDD) and different types of duplex techniques use in wireless communication systems. Using FDD means that the transmitter and receiver operate at different carrier frequencies. Well known examples of FDD system are WCDMA (aka UTRA FDD), LTE FDD etc. In TDD the transmitter and receiver operate on the same carrier frequency but in different time instances (e.g. time slot, subframe). Well known examples of FDD system are UTRA TDD, LTE TDD etc. The HD-FDD is a special case of FDD (aka as full duplex FDD) and in which case the transmitter and receiver operate on different carrier frequencies like in FDD but in different time instances (e.g. time slot, subframe) like in TDD. A well known example of HD-FDD system is GSM. A D2D receiving user equipment is the victim of interference from cellular user equipments and from other D2D transmitting user equipments. The cellular UEs may themselves be D2D capable user equipments or legacy user equipments without D2D capability.

The D2D receiving user equipment may employ different types of receiver algorithms to mitigate, e.g. suppress, cancel or eliminate, interference, as described above.

Interference management by Radio Resource Management (RRM) methods in a mixed cellular and D2D environment may be used. For example the measurements performed by the D2D UE and/or cellular UE on other D2D UE may be used by the network to control interference in the network. For example the network may assign resources to fewer D2D UE when interference based on reported measurement results is higher than a threshold. An example of this is shown in WO 2011/124015.

However, currently, the received interference cannot be adequately managed by the D2D user equipment. This results in that the received signal quality at the D2D user equipment is deteriorated.

SUMMARY

It is therefore an object of embodiments herein to provide a way of improving the performance in a cellular communications network.

According to a first aspect of embodiments herein, the object is achieved by a method in a network node for assisting a first user equipment in interference mitigation. The network node is comprised in a cellular communications network. The cellular communications network further comprises the first user equipment and a second user equipment. The second user equipment causes interference to the first user equipment when at least one of the first user equipment and second user equipment communicate by using Device-to-Device, D2D communication. The network node obtains information about the receiver of the first user equipment. The network node then determines one or more parameters required by the first user equipment for mitigating the interference. The parameters relate to the obtained information and to the interfering second user equipment. The network node then sends the one or more parameters to the first user equipment thereby assisting the first user equipment to mitigate interference caused by the second user equipment.

According to a second aspect of embodiments herein, the object is achieved by a method in a first user equipment for mitigating interference. The first user equipment is served by a network node comprised in a cellular communications network. The cellular communications network further comprises the first user equipment and a second user equipment. The second user equipment causes interference to the first user equipment when at least one of the first user equipment and the second user equipment communicate by using Device-to-Device, D2D communication. The first user receives one or more parameters from the network node. The one or more parameters relate to information about a receiver of the first user equipment and to the interfering second user equipment. The first user equipment mitigates the interference caused by the second user equipment according to the one or more parameters received from the network node.

According to a third aspect of embodiments herein, the object is achieved by a network node for assisting a first user equipment in interference mitigation. The network node is adapted to be comprised in a cellular communications network. The cellular communications network further is adapted to comprise the first user equipment and a second user equipment. The second user equipment is adapted to cause interference to the first user equipment when at least one of the first user equipment and second user equipment communicate by using Device-to-Device, D2D communication. The network node comprises an obtaining circuit configured to obtain information about the receiver of the first user equipment. The network node further comprises a determining circuit configured to determine one or more parameters required by the first user equipment for mitigating the interference. The one or more parameters relate to the obtained information and to the interfering second user equipment. The network node further comprises a sending circuit configured to send the one or more parameters to the first user equipment thereby assisting the first user equipment to mitigate interference caused by the second user equipment.

According to a fourth aspect of embodiments herein, the object is achieved by a first user equipment for mitigating interference. The first user equipment is adapted to be served by a network node comprised in a cellular communications network. The cellular communications network further is adapted to comprise the first user equipment and a second user equipment. The second user equipment is adapted to cause interference to the first user equipment when at least one of the first user equipment and the second user equipment communicate by using Device-to-Device, D2D communication. The first user equipment comprises a receiving circuit configured to receive one or more parameters from the network node. The one or more parameters relate to information about a receiver of the first user equipment and to the interfering second user equipment. The first user equipment further comprises a mitigating circuit configured to mitigate the interference caused by the second user equipment according to the one or more parameters received from the network node.

Since the network node provides parameters for interference mitigation based on the receiver of the first user equipment, which parameters relate to the interfering second user equipment, the first user equipment can in an effective way, mitigate the interference caused by the second user equipment. Thanks to the one or more parameters for interference mitigation, the overall complexity, power consumption and processing are reduced. In this way the performance in the cellular communications network is improved.

An advantage of embodiments herein is that they allow D2D capable user equipments to suppress, cancel or eliminate various types of interference arising from other user equipments by exploiting assistance data provided by the cellular communications network.

A further advantage of embodiments herein is that they enables the D2D capable user equipments to acquire assistance information from the serving network node to facilitate the interference mitigation from other user equipments.

A further advantage of embodiments herein is that also, the network node may take advantage of knowing some of the user equipments receiver capabilities when making RRM decisions.

A further advantage of embodiments herein is that the overall cellular communications network performance and capacity when D2D capable user equipments are active are enhanced.

Thanks to the one or more parameters for interference mitigation, the overall complexity, power consumption and processing are reduced.

BRIEF DESCRIPTION OF THE DRAWINGS

Examples of embodiments herein are described in more detail with reference to attached drawings in which.

DETAILED DESCRIPTION

Figure 1:
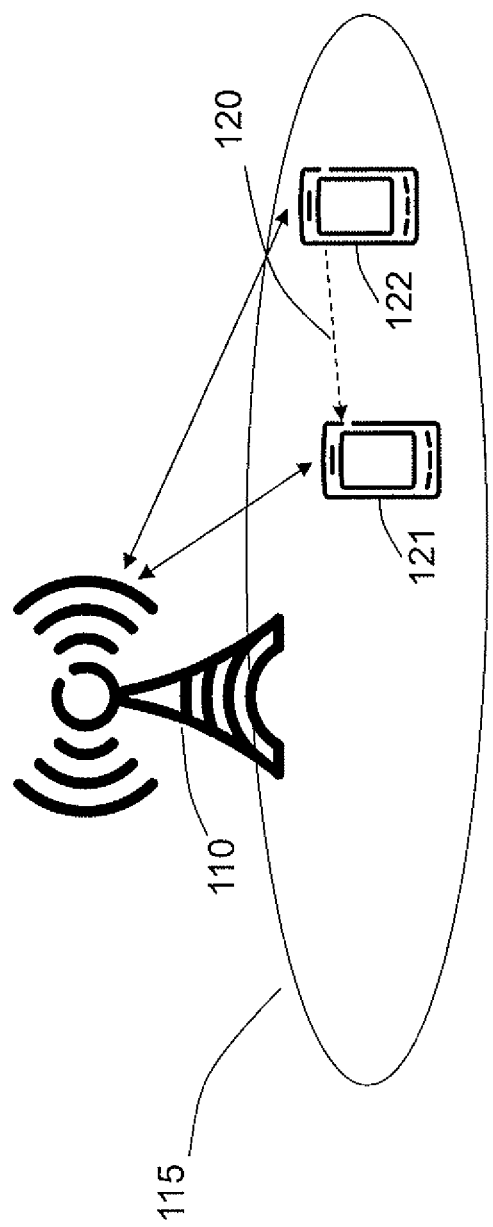
FIG. 1 is a schematic block diagram illustrating embodiments in a cellular communications network.

As part of developing embodiments herein, a problem will first be identified and discussed. Currently, the D2D receiving user equipment is unaware of the source of interference, so the following problems arise:

As mentioned above, the D2D receiving user equipment is unaware of the source of interference. Due to this, the received interference cannot be adequately managed by the D2D user equipment. This results in that the received signal quality at the D2D user equipment is deteriorated. Certain information about an interference signal may be detected blindly. However, blind detection for required modulation format, coding scheme, and time interval is fairly complex. This will put significantly high computation burden on the D2D receiver of the user equipment. Which results in that the complexity, processing and/or power consumption of the D2D receiving user equipment increases.

A D2D receiving user equipment cannot adequately suppress or cancel interference caused by a specific source of interference. For example, if the D2D receiving user equipment does not have the information about the modulation, coding scheme, and pilot symbols used by an interfering transmitter, it cannot perform post-decoding interference cancellation. Even for linear receivers such as MMSE or IRC, if the receiver does not know how interference characteristics vary in time, it will not be able to adapt the interference correlation estimates to better steer the receiver beams toward suppressing the interference.

Embodiments herein comprises methods in a network node and in a first user equipment, wherein at least one of the first user equipment and one or more second user equipments is D2D capable, wherein the second user equipments cause interference to the first user equipment.

According to some example embodiments herein, the method in the network node comprises:

Determining or acquiring the interference mitigation capability of the first user equipment;

Signaling the necessary pieces of assistance information related to one or more signals transmitted by one or more interfering second user equipments, i.e. cellular and/or other D2D user equipments, that the first user equipment requires for mitigating the interference caused by the said interfering second user equipments, The network node may use the determined or acquired said first user equipment capability for one or more radio operation tasks or RRM actions, e.g. assignment of resources, setting of power to other user equipments.

According to some example embodiments herein, the method in the first user equipment comprises:

Signaling its capability of mitigating interference caused by interfering second user equipments to the network node;

Receiving the said assistance information pertinent for interference mitigation;

Using the received said assistance information for mitigating interference caused by at least the said interfering second user equipments. The interference mitigation may comprise of one or more out of: suppression, reduction, elimination or cancellation of said interference.

Assistance information, i.e. related to the signals transmitted by the interfering user equipments, that is provided to the first user equipment may comprise of one or more of:

timing of signal, transport format, signal pattern, reference signal, transmit power, antenna configuration, scrambling code information, scheduling etc. related to interfering second user equipments.

A particular advantage of embodiments herein is that the network node can take advantage of the acquired assistance information for radio resource management such as scheduling, power control and mode selection, purposes. For example, if the network node such as e.g. an eNB knows the capability of the first user equipment of canceling certain type of interference, the network node may decide to schedule an appropriate other user equipment on the same resource block, whereas a first user equipment without such capability is protected by the network node by not scheduling any other user equipment on the same resource block.

FIG. 1 depicts a cellular communications network 100 in which embodiments herein may be implemented. The cellular communications network 100 is a wireless communication network such as an LTE (e.g. LTE FDD, LTE TDD, LIE HD-FDD), WCDMA, UTRA TDD, GSM network, GERAN network, enhanced data rate for GSM evolution (EDGE) network, network comprising of any combination of RATs such as e.g. Multi-Standard Radio (MSR) base stations, multi-RAT base stations etc., any 3GPP cellular network, Wimax, or any cellular network or system.

The cellular communications network 100 comprises a plurality of network nodes whereof one, a network node 110 is depicted in FIG. 1. The network node 110 may be a radio base station such as e.g. an eNB, an eNodeB, or an Home Node B, an Home eNode B or any other network node capable to serve a user equipment or a machine type communication device in a cellular communications network. The network node 110 is serving a cell 115.

A number of user equipments are located in the cell 115 served by the network node 110. In the example scenario of FIG. 1, only two user equipments are shown in the cell 115. One of them is a first user equipment 121. The cell 115 may comprise one or more first user equipments 121.

Further, one or more second user equipments 122 are located in the cell 115, whereof one second user equipment 122 is shown in FIG. 1.

At least one of the first user equipment 121 and the second user equipment 122 are capable of communicate with user equipments in its respective vicinity using D2D communication. The one or more second user equipments 122 causes interference to the first user equipment 121 when at least one of the first user equipment 121 and second user equipment 122 communicate by using D2D communication. The first user equipment 121 and the second user equipment 122 are further capable of accessing the cellular communications network 100 via the network node 110 when they are located in the cell 115. The first user equipment 121 and the second user equipment 122 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicate over a radio link in a cellular communications network.

User equipments such as the first user equipment 121 and the second user equipment 122 in FIG. 1, attempt to discover user equipments in a local range that can provide a given type of service. The first user equipment 121 may make use of some D2D technology and broadcast a beacon signal 120 which may be received by a peer such as the second user equipment 122, thereby enabling device discovery. There may be multiple D2D technologies in operation which may carry a beacon signal 120. Possible options include 802.11 WLAN, Bluetooth, or a possible future D2D extension of LTE, or other technologies such as the wireless sensor technology.

Figure 2:
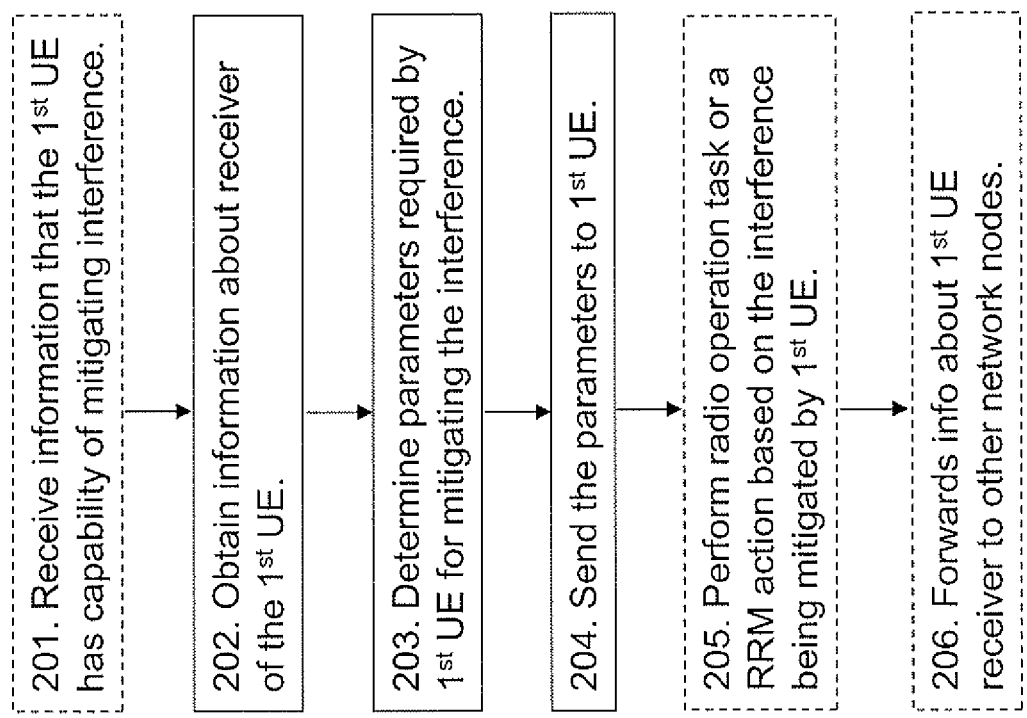
FIG. 2 is a flowchart depicting embodiments of a method in a network node.

Example of embodiments of a method in the network node 110 for assisting the first user equipment 121 in interference mitigation, will now be described with reference to a flowchart depicted in FIG. 2. As mentioned above, the network node 110 is comprised in the cellular communications network 100. The cellular communications network 100 further comprises the first user equipment 121 and a second user equipment 122. The second user equipment 122 causes interference to the first user equipment 121 when at least one of the first user equipment 121 and second user equipment 122 communicate by using D2D communication. The second user equipment 122 may comprise one or more second user equipments 122. The method comprises the following actions, which actions may be taken in any suitable order. Dashed lines of some boxes in FIG. 2 indicate that this action is not mandatory.

Action 201

This is an optional action. The network node 110 may in some embodiments receive from the first user equipment 121, information that the first user equipment 121 has capability of mitigating interference caused by at least one second user equipment 122. This is to be informed of the mitigating capabilities of the first user equipment 121 in the network node 110.

This type of capability is typically part of the radio access capability which the first user equipment 121 may report to the network node 110 at setup. The capability information may be required since the first user equipment 121 may not be capable of mitigating interference. The capability information may also be needed since there may be several variants of interference mitigation supported by different first user equipment 121. Therefore the reported capability may also comprise different types and/or additional information. For example the first user equipment 121 may report its capability indicating that it is capable of mitigating interference:

caused by up to L number of second user equipment 122 and/or caused by the second user equipment 122 when transmitting specific channels or signals e.g. data channel, control channel, physical signals and/or provided certain parameters (e.g. scheduling information, scrambling codes etc.) are provided by the network node 110 to the first user equipment as part of assistance information.

The first user equipment 121 may send the capability information to the network node 110 in any of the following manner:

Proactive reporting without receiving any explicit request from the network node 110, e.g. serving or any target network node.

Reporting upon receiving any explicit request from the network node 110, e.g. serving or any target network node.

The explicit request may be sent to the first user equipment 121 by the network node 110 anytime or at any specific occasion. For example the request for the capability reporting may be sent to the first user equipment 121 during initial setup or after a cell change such as e.g. handover, RRC connection re-establishment, RRC connection release with redirection, PCell change in carrier aggregation or multi-carrier operation etc.

In case of proactive reporting the first user equipment 121 may report its capability during one or more of the following occasions:

During initial setup or call setup e.g. when establishing the RRC connection.

During cell change such as e.g. handover, primary carrier change in multi-carrier operation, PCell change in multi-carrier operation, RRC re-establishment, RRC connection release with redirection etc.

The receiving network node 110 uses the received capability information from the first user equipment 121 for various network operational tasks. According to one example the capability information received by the network node 110 may be signaled to another node, e.g., to another UE in D2D communication mode, radio network node, core network node, positioning node. These nodes may use this information for example after cell change. Therefore the first user equipment 121 may not have to again signal its capability to the network node 110 after the cell change. The network may also use the capability information for determining the parameters to be included in the assistance information sent to the first user equipment 121 for enabling interference mitigation.

Action 202

The network node 110 obtains information about a receiver of the first user equipment 121.

In some embodiments, this may be performed explicitly by receiving it from the first user equipment 121. In some other embodiments, this may be performed implicitly by deriving it from the first user equipment 121 reported radio measurements. This may e.g. be channel state information, or CSI reported by the first user equipment to the network node 110. This may further be performed implicitly by deriving it from performance indicators such as e.g. Hybrid Automatic Repeat reQuest (HARQ) performance or BLock Error Rate (BLER), throughput, bit rate, data rate etc. HARQ is used for facilitating fast error detection and correction. A HARQ transmission is accompanied by an acknowledgement message (aka ACK/NACK). For example the receiver receiving a Transport Block (TB) or a data block sends an ACK/NACK to the transmitter to indicate whether the TB is correctly received or not. Based on the received statistics of ACK/NACK the network node 110 may determine the BLER of the transmitted TB or data block to the receiver.

The information about the receiver may comprise receiver type and/or algorithms used by the first user equipment 121 for mitigating interference caused by the second user equipment 122. This information is useful in the sense that the type of assistance information sent by the network node 110 to the D2D user equipment such as the first user equipment 121 for interference mitigation depends upon the characteristics of the receiver. Therefore the network node 110 may use the received information to decide and send only relevant information to the first user equipment 121 for the interference mitigation.

This action of obtaining information may further comprise obtaining information about the location of the second user equipment 122, and/or relative location such as e.g. path loss or distance between the second user equipment 122 and the first the user equipment 121, and/or radio measurements performed by the second user equipment 122. This information enables the network node 110 to identify strong interferers causing interference to the D2D user equipment such as the first user equipment 121. This in turn assists the network node 110 to select the most important and relevant interferers, which are to be included in the assistance information sent to the first user equipment 121 for interference mitigation.

The obtaining information may further comprise obtaining information about radio operational parameters in the cellular communications network 100. The radio operational parameters may relates to one or more out of: network synchronization, cell size and cell load. The network synchronization may be expressed in terms of time synchronization between cell timings. For example the network synchronization may be defined as the magnitude of the difference between the start of frame timings of any two cells in the network or in a coverage area. For example synchronization level between any two cells may be in the order of 3 μs. The cell size may be expressed in terms of cell range, cell radius, inter-site distance, e.g. 1.5 km, between the sites or base station locations. Examples of cell load are cell transmitted power, cell throughout or aggregated bit rate, number of users in a cell, amount of data or traffic in the buffer or in memory in the base station etc. The radio operational parameters are used for radio operational tasks e.g. planning, tuning and optimizing of parameters used in the cellular communications network 100. This will lead to overall improvement of the performance of the cellular communications network 100.

According to this Action 202, the network node 110 obtains information about the receiver of the first user equipment 121. This information may comprise preferred and/or available receiver types and algorithms used by the first user equipment for mitigating interference caused by other user equipments such as the one or more second user equipments. This information may be obtained in explicit or implicit manners or combination thereof:

In the explicit approach, the first user equipment 121 may use signaling with the network node 110 prior to link or bearer establishment to indicate to the network node 110 its receiver capabilities and preferences that it prefers to use when D2D mode is used in the network, as part of the user equipment capability information. The first user equipment 121 may also indicate its receiver capability at cell change, e.g. after handover, to the new serving network node. The old serving network node 110 may also forward the first user equipment receiver capability information to other network nodes such as e.g. a target eNB during cell change operation.

For example, it may indicate whether it supports MMSE, MMSE-SIC or other types of receivers for mitigating the interference caused by other UEs when D2D communication mode is used.

Different types of receives have different ability to mitigate the interference. They may also have capability to mitigate different types of interference e.g. interference caused by control signals, interference caused by data signals, any type of interference caused by a radio transmitter etc. This information is used by the network node 110 to decide which receiver type the first user equipment 121 should have for mitigating the interference caused by other user equipments such as the second user equipment 122 when communicating using D2D. This information may be used by the network node 110 to determine the type of information, which depends upon the receiver type, that should be provided to the first user equipment 121 by the network node 110 in assistance information.

It may also indicate additional capability information indicating whether the supported advanced receiver may be used for mitigating the interference on all type of transmitted signals, or on specific types of transmitted signals, or on specific type of channel. Examples of channels are data channels and control channels. For example the first user equipment 121 may indicate that it is capable of using MMSE for all types of signals but MMSE-SIC for reference signals. In another example the first user equipment 121 may indicate that it is capable of using MMSE and MMSE-SIC only on data channels and reference signals. The additional information may also indicate the maximum number of interfering user equipments whose interference can be mitigated on all or subset of signals/channels.

Note that the first user equipment 121 may want to use different receiver algorithms when operating in D2D mode and when operating in cellular mode. For example, in an FDD cellular system, the first user equipment 121 may use frequency division duplexing in cellular mode and time division duplexing for the D2D link when in D2D mode. Therefore the first user equipment 121 may also explicitly indicate its receiver capability applicable in different operation modes such as e.g. cellular or D2D mode.

In the implicit approach, the network node 110 obtains information about the receiver of the first user equipment 121 based on first user equipment 121 reported measurements. It may be the first user equipment 121 that sends report because it will mitigate interference caused by other D2D or cellular user equipments such as the second user equipment 122. Reported measurements such as e.g. channel state information, and/or CSI reports may determine the type of receiver employed by the first user equipment 121. Further, reported other performance indicators such as e.g. hybrid ARQ, and/or HARQ performance, bit rate, throughput etc., e.g. block error rate may be used to determine the type of receiver employed by the D2D user equipment such as the first user equipment 121. For example if the first user equipment reports CQI better than a reference user equipment which has baseline receiver under the same or similar radio conditions then the network node 110 may deduce that the first user equipment 121 has an interference mitigating receiver.

In the combined explicit and implicit approach the first user equipment 121 may signal its receiver capability with limited information to the network node 110. The details of the receiver type employed by the first user equipment 121 may be determined by the network node 110. For example the first user equipment 121 may only indicate in the signalling that its receiver is capable of mitigating interference from other user equipments when D2D communication is used in the cellular communications network 100. The network node 110 may then determine the type of receiver employed by the first user equipment 121, using different types of measurement reports. These may be reports such as e.g. signal strength and CSI, sent by the first user equipment 121 reporting whether the first user equipment 121 is capable of mitigating interference on specific channels, e.g. synchronization signals and reference signals, or from all types of channels.

Action 203

The assistance information represented by the one or more parameters, required by the first user equipment 121 for mitigating interference from the one or more second user equipments 122 may depend upon:

At least its receiver type; and

Radio operational parameters, which may comprise of one or more of: level of network synchronization, cell size, cell load etc.

Interfering one or more second user equipments 121 location with respect to the first user equipment 121 e.g. distance between the first user equipment 121 and the one or more second user equipments 122, path loss between the first user equipment 121 and the one or more second user equipments 122, second user equipments' 122 location etc.

Thus the network node 110 determines one or more parameters required by the first user equipment 121 for mitigating the interference. The parameters relate to the obtained information and to the interfering second user equipment 122.

In some embodiments the determining of the one or more parameters may further comprise to determine which second user equipments 122 that are causing interference to the first user equipment 121.

The determined one or more parameters may comprise one or more out of: timing of interference signal, transport format, signal pattern, information about reference symbols, transmit power, number of layers, precoder matrix used for each layer, antenna configuration, scrambling code information, CDMA channelization code or scheduling related information, e.g. scheduling grant. The CDMA channelization code information is specially used for scheduling of data and/or control in case of CDMA interference. The CDMA channelization code information may comprise the spreading factor of the code, identity or location of the code in a CDMA code tree.

The one or more parameters may be associated with one or more specific channels causing the interference.

This action of determining the one or more parameters may further be based on the location of the second user equipment 122 and/or radio measurements performed by the second user equipment 122 if such information was obtained in Action 202.

The determining of the parameters may further be based on the radio operational parameters in the cellular communications network 100 if such information was obtained in Action 202.

The determining of the parameters will be explained more in detail below.

Action 204

The network node 110 then sends the parameters to the first user equipment 121. In this way the network node 110 assists the first user equipment 121 to mitigate interference caused by the second user equipment 122.

This means that after determining the assistance information, i.e. the one or more parameters, the network node 110 sends the assistance information, i.e. the one or more parameters to the first user equipment 121. This may be performed by signalling the one or more parameters to the first user equipment 121 in different ways. It may be signalled periodically, when the information is modified, when new information is required to be sent to the first user equipment 121, after certain time period, TO, compared to the signaling of the last the one or more parameters, and/or in response to receiving explicit request from the first user equipment 121, e.g. the first user equipment requests additional or renewed information.

The one or more parameters may either be generic or it may be associated with specific channels and/or physical signals. In the former case it may be used by the first user equipment 121 for mitigating interference on all or several channels e.g. control channels, data channel etc. Specific examples of control channels and data channels transmitted by the first user equipment 121 are PUCCH and PUSCH respectively. In the latter case the first user equipment 121 may use it for mitigating interference on specific physical signals e.g. interference on demodulation reference signals, sounding reference signals, beacon signals and/or synchronization signals sent by the second user equipment 122. The first user equipment 121 is therefore capable of interpreting the received one or more parameters, which indicate whether the first user equipment 121 should mitigate interference on specific control channel(s), data channel(s), physical signals (s) or on all channels and signals.

According to embodiments herein, the serving radio network node 110 maintains control signaling with both the user equipments performing cellular communication in and the D2D pair user equipments. Control plane signaling with a D2D pair may happen at different time scales, but typically it is on the ~100 ms time scale and is performed over a control channel. The time scale of the control plane signaling indicates the rate, frequency and intensity with which the control information may be exchanged between the first user equipment 121 and the serving radio network node 110. This control channel may be used for sending the one or more parameters and other relevant information to the first user equipment 121 and/or to any D2D communication or cellular communicating user equipment enabling it to improve its receiver performance. For example the assistance information sent by the serving radio network node 110 to the first user equipment 121 to enable it to mitigate interference is communicated using this control channel. The first user equipment 121 also uses this control channel to communicate its receiver capabilities to the serving radio network node 110. The network node 110 may transmit on a downlink control channel whereas the user equipment may transmits on a uplink control channel.

Action 205

This is an optional action. In some embodiments, the network node 110 performs a radio operation task or an Radio Resource Management (RRM) action based on that the interference is mitigated by the first user equipment 121.

This means that the network node 110 may also use or take into account the acquired capability of the first user equipment 121 in terms of mitigating interference caused by one or more second user equipments 122 for performing one or more radio operation tasks or RRM actions related to the first user equipment 121. In other words the network node 110 may adapt an RRM strategy based on the acquired capability of the first user equipment 121 in terms of mitigating interference caused by the second user equipments 122. Examples of radio operation tasks or RRM actions are as follows: Assignment or scheduling of resources such as e.g. transport blocks (TB), data blocks, Modulation and Code Scheme (MCS), transport format of TB or data block to scheduled user equipments, setting or controlling of scheduled user equipment transmission power, selection of antenna transmission mode of a scheduled user equipment for transmitting signals, and/or admission control e.g. limit of maximum number of users, maximum allowed bit rate to a scheduled user equipments.

For example if the network node 110 acquires information that there are large number of first user equipments 121 which are capable of mitigating interference caused by other second user equipments 122s, then the network node 110 may use more aggressive RRM strategy. More specifically in this case the network node 110 may allow higher output power to other user equipments, which may be any user equipment, D2D or cellular user equipment, which causes interference to the first user equipment 121 and/or less robust transport format and/or admit more user equipments to be scheduled. This is because in this example all or large number of the first user equipments 121 are able to mitigate the interference from second user equipments 122 and thus overall performance will not be degraded. On the other hand the system capacity especially for D2D communication may be enhanced.

According to another aspect of this embodiment, the network node 110 may also use more detailed information related to the first user equipment interference mitigation capability information for radio operation or RRM actions. For example the network node 110 may use aggressive resource assignment strategy on those signals and/or channels whose interference can be mitigated by the first user equipment 121.

In practice the first user equipment 121 may not always use all its interference mitigation capability for mitigating interference. It may use its capability for mitigating interference from a subset of signals and/or channels transmitted by other user equipments. Thus according to another aspect of this embodiment, for performing one or more radio operation or RRM actions, the network node 110 may also take into account the fact whether the first user equipment 121 is currently using its interference mitigation capability for mitigating interference on one or more signals sent by other user equipments or not. For example the network node 110 may use aggressive resource assignment strategy for those signals and/or channels whose interference is currently mitigated by the first user equipment 121 i.e. when first user equipment 121 is actively using at least part of its receiver capability.

Action 206

This is also an optional action. In some embodiments, the network node 110 forwards the information about the receiver of the first user equipment 121 to the one or more second network nodes 122.

The following description may be applicable to any suitable embodiments herein.

To realize the concept of embodiments herein, the invention comprises the steps in the network node 110 and in the first user equipment 121 as described above and in the following sections.

There are some actions, which may be performed either by the network node 110 or by the first user equipment 121 or mutually by both the network node 110 and the first user equipment. These actions are:

Acquisition of information related to the first use equipment receiver structure.

Determination of assistance information pertinent to interference mitigation.

Signaling of assistance information to the first user equipment

Use of assistance data by first user equipment for interference mitigation

Determining the One or More Parameters, Relating to Action 203.

Receiver Information.

The first user equipment 121 receiver capability is used for determination of assistance information, i.e. the one or more parameters.

Therefore, upon obtaining the first user equipment 121 receiver information, the network node 110 determines the one or more parameters, which can assist the first user equipment 121 to mitigate the interference from the one or more second user equipments 122 when D2D communication is used.

The network node 110 may also request the first user equipment 121, which may be a D2D user equipment or cellular user equipment, to indicate the type of information needed to assist its receiver in suppressing or cancelling interference from the one or more second user equipments 122. The first user equipment 121 may in response indicate the required pieces of information for such as e.g. interfering signal power levels, transport format of the interfering signals, scheduling related information of the interfering signals, carrier frequency of the interferer, indication whether the interfering signal is from a D2D user equipment or from a cellular user equipment, type of channels and/or physical signals causing interference, each of its supported receiver types and/or receiver algorithms. The network node 110 may then use or take into account the first user equipments 121 indication or received information when determining the assistance information, i.e. the one or more parameters to be sent to the first user equipment 121 for interference mitigation.

Radio Operational Parameters.

The network node 110 may also optionally use one or more radio operational parameters for determining the one or more parameters. For example if the network synchronization level is very stringent, e.g. user equipment transmitters are synchronized well within a Cyclic Prefix (CP) length, then the one or more parameters may not require timing information of the one or more second user equipments 122. The network node 110 may also use existing network configuration parameters for determining the assistance data. This is described with the help of few specific examples below:

According to embodiments herein first user equipment 121 mitigate interference received from the second user equipment 122. At least one of the first user equipment 121 and the second user equipment 122 are a D2D user equipment. That means both the first user equipment 121 or the second user equipment 122 may be a D2D user equipment. For example, when the network node 110 schedules the first user equipment 121 being in cellular mode, it also informs one or more of the other of the second user equipments 122 being in D2D mode about specific values within an UL scheduling grant message sent to the cellular mode second user equipments 122, which values are important for the first user equipment 121 to know. E.g. how the DMRS sequence is constructed, used by the second user equipments 122 being in cellular mode for transmission. The information may also be used by the first user equipment 121, e.g. D2D user equipment or cellular user equipment for cancelling or suppressing interference from other user equipments which are second user equipments 122. For example the network node 110 may use semi static cyclic Zadoff-Chu shifts in order to minimize the signaling necessary to the first user equipment 121 when transmitting in the uplink. For example semi static cyclic Zadoff-Chu shifts are used when the user equipment transmits sounding reference signal (SRS) on the uplink to facilitate channel quality estimate at the network node. A Zadoff-Chu sequence is a complex-valued mathematical sequence which, when applied to radio signals, gives rise to an electromagnetic signal of constant amplitude, whereby cyclically shifted versions of the sequence imposed on a signal result in zero cross-correlation with one another at the receiver. The semi static cyclic Zadoff-Chu shift here means the parameter is configured or the existing value is changed by the network node 110 at the user equipment on slower time scale e.g. at the call setup, once every 1-5 seconds etc.

The network node 110 may also indicate to the first user equipment 121, timing information of the schedule of the cellular mode second user equipment 122. The timing information may comprise of the user equipment frame start timing (TO) when the second user equipment 122 transmits its signal in the uplink e.g. the time, TO, may be with respect to a reference time such as the frame start timing of the serving network node, an absolute reference timing, a global reference clock, e.g. GPS timing. This information allows the first user equipment 121 to know when the cellular mode second user equipment 122 transmits. The network node 110 may use semi-static, persistent, scheduling of cellular mode second user equipment 122 transmissions so that timing information does not need to be signaled to first user equipment 121 excessively often.

The network node 110 may also include MCS information to the first user equipment in the assistance data, i.e. in the one or more parameters. The MCS information is about MCS being used by the cellular mode second user equipment 122. The network node 110 may restrict the possible MCSs that are allowed by the cellular mode second user equipment 122 while the cellular mode second user equipment 122 and the first user equipment are scheduled on the same Physical Resource Block (PRB).

Depending upon the scenario the network node 110 may include various additional pieces of information in the one or more parameters for assistance. Some examples of the pieces of information relates to signals transmitted by the interfering one or more second user equipments 122, that the network node 110 may determine based on the above principles may be as follows:

Timing of interference signals; e.g. transmit timing of interfering second user equipments 122;

Information related to transport format used by the interfering second user equipments 122, e.g. MCS used by the transmitter;

Number of layers i.e. the number of spatially multiplexed data streams transmitted by scheduled interfering second user equipments 122, this relates to (MIMO-capable user equipments;

The precoder matrix used for each MIMO layer;

Transmit power of the interfering second user equipments 122, comprising beam forming weights or precoding matrix;

Information about Reference Symbols (RS) transmitted by the interfering second user equipments 122, E.g. how many TX antennas that transmit RS; DMRS information, SRS information such as its pattern in time and/or in frequency domain, etc.

Scrambling code related information if used by the interfering second user equipments 122 for uplink transmission, in the case of CDMA;

Scheduling information or pattern of uplink signals transmitted by interfering second user equipments 122 such as e.g. uplink grant, uplink data transmission, or uplink DTX.

Location of and/or radio measurements performed by the second user equipment 122. An interfering second user equipment 122 may be one of the scheduled user equipments, i.e. a second user equipment 122 scheduled on the same PRBs as used by the first user equipment 121. However, all user equipments scheduled by the network node may not be interfering second user equipments 122. For example, a user equipment may transmit using high output power but it may still not cause interference to the first user equipment 121. This may occur if the scheduled user equipment is not in the vicinity of the first user equipment 121. In one example, a scheduled user equipment may be far away from the first user equipment 121 and thus will not be an interfering user equipment, from the perspectives of the first user equipment 121. Another example is that a scheduled user equipment which may potentially cause interference to the first user equipment is located outdoor while a D2D communication between the first user equipment and another user equipment occurs inside an office building, and is thus not interfering with the first user equipment 121. Yet another example is that a scheduled user equipment and the first user equipment 121 are isolated due to a large shadowing effect e.g. in separate rooms of the same building with large penetration loss, and is thus not interfering with the first user equipment 121.

Therefore, according to some embodiments, the network node 110 may also use any suitable mechanism to determine the one or more interfering second user equipments 122 or the N strongest one or more interfering second user equipments 122. The network node 110 may e.g. use any prior art mechanism such as location information to find out the scheduled user equipments which are the one or more second user equipments 122 that interfere with the first user equipment 121. For example, the network node 110 may use uplink received signals from the scheduled user equipments, such as the time of arrival of signal, angle of arrival, etc., to determine their approximate locations. It may even use other methods such as the Global Navigation Satellite System (GNSS), Assisted GNSS (A-GNSS), Uplink or Observed Time Difference of Arrival (UTDOA or OTDOA) for finding the respective scheduled user equipment location. The network node 110 may also use pre-determined geographical, architectural knowledge or material knowledge to further determine if the respective scheduled user equipments are an interferer to the first user equipment 121 even though they are physically close to each other. For example the network node 110 may determine the location of the respective scheduled user equipments and in addition the network node 110 may also use a pre-determined map of a building to identify whether the respective scheduled user equipments are in the same room or office or not as the first user equipment 121. The network node 110 may also have pre-determined knowledge about the penetration loss of the floors, ceiling etc. These additional pieces of knowledge will further narrow down the identification to real and stronger interferers.

According to some embodiments, the network node 110 may also use another suitable mechanism in addition to the location information, as described in the preceding embodiment, to determine the one or more interfering second user equipments 122 or the N strongest one or more interfering second user equipments 122. For example the network node 110 may request the first user equipment 121 to report one or more radio measurements performed by the first user equipment 121 on the signals transmitted by one or a plurality of the one or more second user equipments 122. The first user equipment 121 may also proactively, i.e. without receiving an explicit request, report to the network node 110 one or more radio measurements performed on the signals transmitted by one or plurality of the second user equipment 122. The first user equipment 121 may also provide identifiers of the corresponding second user equipment 122 whose radio measurement results are reported to the network node 110. The first user equipment 121 determines the identifier of the one or more second user equipments 122 during a radio measurement procedure. Examples of radio measurements are signal strength such as Reference Signal Received Power (RSRP), signal quality such as Reference Signal Receive Quality (RSRQ), BLER etc, interference level such as carrier Received Signal Strength Indicator (RSSI), received total interference power etc. The network node 110 uses a suitable criteria to select the interferers based on the reported radio measurement results. For example the network node 110 may select those second user equipments 122 as the interfering second user equipments 122 which correspond to the N strongest radio measurement reports. The network node 110 may also combine the radio measurement reports with other information to select the interfering second user equipments which cause strong interference towards the first user equipment's 121 receiver. Examples of other information are location of the second user equipments 122 and/or the location of the first user equipment 121, receiver capability of the first user equipment 121, isolation level between the first and the second user equipments 121, 122 etc.

In this way the network node 110 may only send the assistance data representing the one or more parameters, related to those user equipments which are close to the first user equipment 121, i.e. only send to the interfering second user equipments. This will reduce processing in the first user equipment 121 since it has to mitigate interference typically from a limited set of UEs which are strongest interferers, i.e. the one or more second user equipments 122. This approach will also reduce the signaling overheads. For determining the details of the assistance data pertaining to the actual interfering user equipments, i.e. the one or more second user equipments 122, the network node 110 may use the same principles as described in the sections above.

Figure 3:
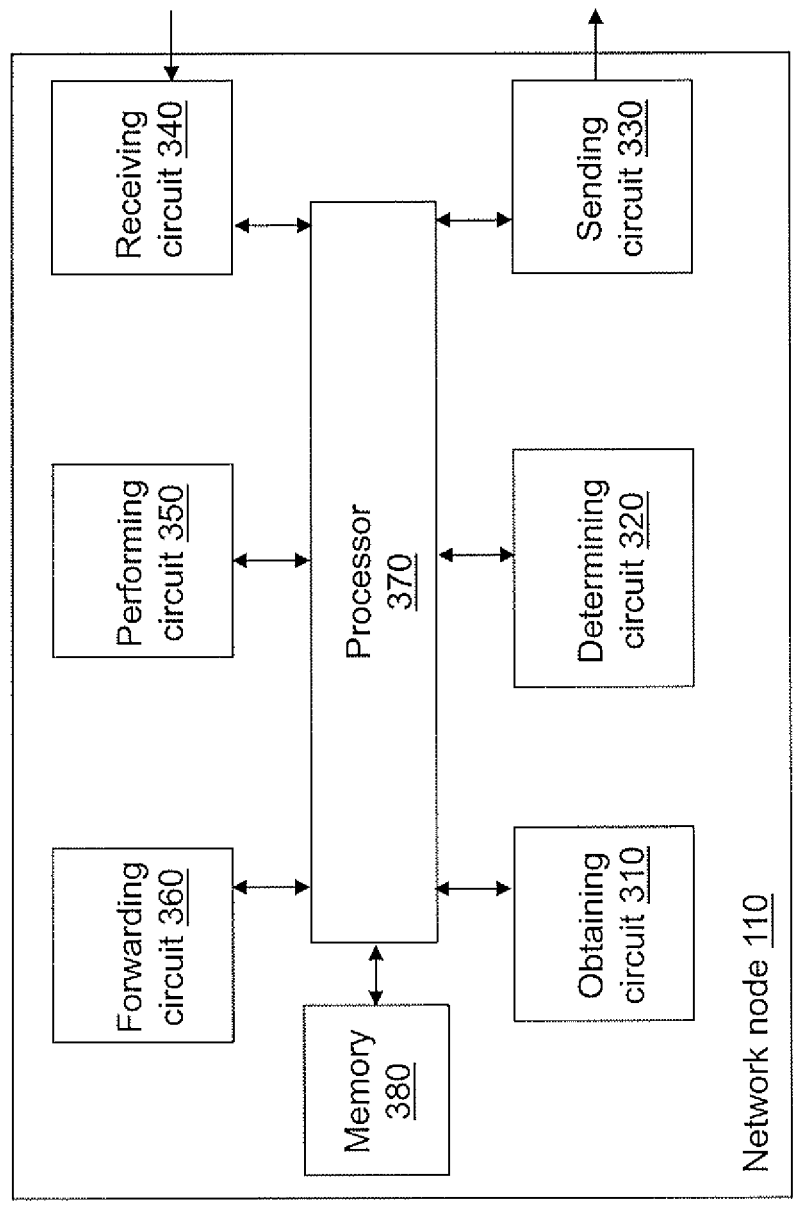
FIG. 3 is a schematic block diagram illustrating embodiments of a network node.

To perform the method actions for assisting a first user equipment 121 in interference mitigation described above, the network node 110 comprises the following arrangement depicted in FIG. 3. As mentioned above the network node 110 is adapted to be comprised in the cellular communications network 100. The cellular communications network 100 is further adapted to comprise the first user equipment 121 and the second user equipment 122. The second user equipment 122 is adapted to cause interference to the first user equipment 121 when at least one of the first user equipment 121 and second user equipment 122 communicate D2D communication. In some embodiments, the second user equipment 122 comprises one or more second user equipments 122.

The network node 110 comprises an obtaining circuit 310 configured to obtain information about the receiver of the first user equipment 121. The information about the receiver may comprise receiver type and/or algorithms adapted to be used by the first user equipment 121 for mitigating interference caused by the second user equipment 122.

In some embodiments, the obtaining circuit 310 further is configured to obtain the information about the receiver explicitly by receiving it from the first user equipment 121.

The obtaining circuit 310 may further be configured to obtain the information about the receiver implicitly by deriving it from the first user equipment 121 reported radio measurements such as e.g. channel state information and/or CSI reports, or performance indicators.

The obtaining circuit 310 may further be configured to obtain information about the location of the second user equipment 122, and/or radio measurements performed by the second user equipment 122.

In some embodiments, the obtaining circuit 410 further is configured to obtain information about radio operational parameters in the cellular communications network 100. The radio operational parameters may relate to one or more out of: network synchronization, cell size and cell load.

The network node 110 further comprises a determining circuit 320 configured to determine one or more parameters required by the first user equipment 121 for mitigating the interference. The one or more parameters relate to the obtained information and to the interfering second user equipment 122.

The determining circuit 320 may be configured to determine the parameters further based on the location of the second user equipment 122 and/or radio measurements performed by the second user equipment 122.

The determining circuit 320 may further be configured to determine the one or more parameters by determining which second user equipments 122 that are causing interference to the first user equipment 121.

In some embodiments, the determining circuit 320 is configured to determine the one or more parameters further based on the radio operational parameters.

The one or more parameters may comprise one or more out of: timing of interference signal, transport format, signal pattern, information about reference symbols, transmit power, number of layers, precoder matrix used for each layer, antenna configuration, scrambling code information in the case of CDMA interferer, scheduling of data and/or control, or scheduling or configuration of physical signals, e.g. SRS, Demodulation Reference Signals (DM-RS).

The determined one or more parameters may be associated with one or more specific channels causing the interference.

The network node 110 further comprises a sending circuit 330 configured to send the parameters to the first user equipment 121 thereby assisting the first user equipment 121 to mitigate interference caused by the second user equipment 122.

The network node 110 further comprises a receiving circuit 340 configured to receive from the first user equipment 121, information that the first user equipment 121 has capability of mitigating interference.

The network node 110 may further comprise a performing circuit 350 configured to perform a radio operation task or an RRM action based on that the interference is mitigated by the first user equipment 121.

In some embodiments, the network node 110 further comprises a forwarding circuit 360 configured to forward the information about the receiver of the first user equipment 121 to a second network node.

The embodiments herein for assisting a first user equipment 121 in interference mitigation may be implemented through one or more processors, such as a processor 370 in the network node 110 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The base station 110 may further comprise a memory 380 comprising one or more memory units. The memory 380 is arranged to be used to store the information about the receiver of the first user equipment 121, the one or more parameters required by the first user equipment 121 for mitigating the interference, the information about radio operational parameters in the cellular communications network 100, the information about the location of the second user equipment 122, the location of the second user equipment 122 with respect to the first user equipment, e.g. relative distance between them, and/or radio measurements performed by the second user equipment 122, isolation level between the first user equipment 121 and the second user equipments 122, i.e. interfering user equipment, data, configurations, schedulings, and applications to perform the methods herein when being executed in the network node 110.

Those skilled in the art will also appreciate that the obtaining circuit 310, the determining circuit 320, the sending circuit 330, the receiving circuit 340, the performing circuit 350, and/or the forwarding circuit 360 described above may refer to a combination of analog and digital circuits, and/or one or more processors configured with software and/or firmware, e.g. stored in a memory such as the memory 380, that when executed by the one or more processors such as the processor 370 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 4:
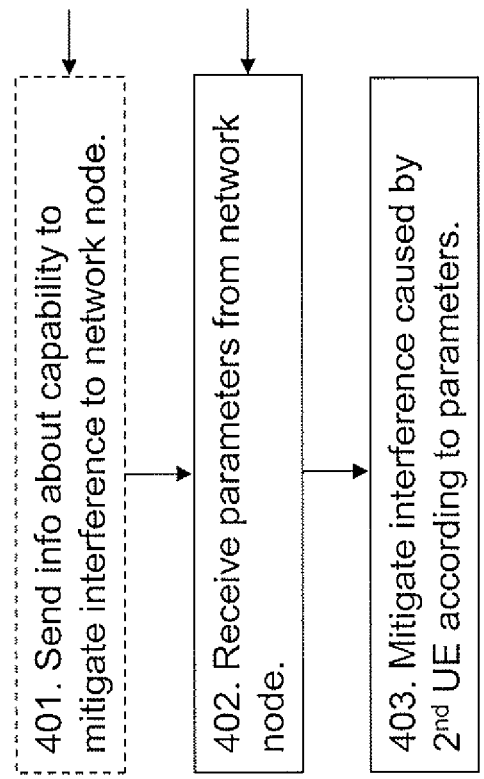
FIG. 4 is a flowchart depicting embodiments of a method in a first user equipment.

An example of embodiments of a method in the first user equipment 121 for mitigating interference, will now be described with reference to a flowchart depicted in FIG. 4 As mentioned above, the first user equipment 121 is served by the network node 110 comprised in the cellular communications network 100. The cellular communications network 100 further comprises the first user equipment 121 and a second user equipment 122. The second user equipment 122 causes interference to the first user equipment 121 when at least one of the first user equipment 121 and the second user equipment 122 communicate by using D2D communication. The second user equipment 122 may comprise one or more second user equipments 122. The method comprises the following actions, which actions may be taken in any suitable order. Dashed lines of some boxes in FIG. 4 indicate that this action is not mandatory.

Action 401

In some embodiments, the first user equipment 121 sends information to the network node 110. The information comprises that the first user equipment 121 has capability of mitigating interference.

In some embodiments, the sending of information to the network node 110, further comprises sending information about the receiver of the first user equipment 121. The information about the receiver may comprise receiver type and/or algorithms used by the first user equipment 121 for mitigating interference caused by the second user equipment 122.

Action 402

The first user equipment 121 receives one or more parameters from the network node 110. The parameters relate to information about a receiver of the first user equipment 121 and to the interfering second user equipment 122.

The received one or more parameters may comprise one or more out of: timing of interference signal, transport format, signal pattern, information about reference symbols, transmit power, number of layers, precoder matrix used for each layer, antenna configuration, scrambling code information in the case of CDMA interferer, scheduling, or the number of second user equipments 122 that causes interference to the first user equipment 121.

The received one or more parameters may be used for determining which second user equipments 122 that are causing interference to the first user equipment 121 and their respective corresponding interference level and/or selecting the type of receiver to be used, in order to perform the mitigation.

In some embodiments, the one or more parameters further relate to information about radio operational parameters in the cellular communications network 100 and/or location of one or more second user equipments 122 and/or radio measurements performed by the one or more second user equipments 122. The radio operational parameters may relate to one or more out of: network synchronization, cell size and cell load.

The received one or more parameters may be associated with one or more specific channels causing the interference.

Action 403

The first user equipment 121 mitigates the interference caused by the second user equipment 122 according to the parameters received from the network node 110.

The mitigating the interference may comprise suppressing, reducing, eliminating or cancelling said interference.

The first user equipment 121 uses the assistance information, i.e. the one or more parameters received from the network node 110, for mitigating interference caused by one or more interfering second user equipments.

The first user equipment 121 uses the received the one or more parameters e.g. for:

Selecting the type of receiver to use for mitigating, suppressing or cancelling interference in case more than one type of receiver supports D2D. E.g. selecting receiver type for which the assistance information is adequate;

Determining the one or more interferer i.e. the one or more second user equipments and their respective corresponding interference and Mitigating the interference by e.g. suppressing, cancelling or reducing the interference.

The first user equipment 121 obtains the one or more parameters described in the previous actions and uses them to enable different kinds of receiver algorithms such as e.g. for the following two types of receivers:

Linear interference suppressing receiver such as e.g. an Interference Rejection Combining (IRC)/Minimum Mean Square Error (MMSE) receiver.

Nonlinear, subtractive-type of interference cancellation receiver such as e.g. MMSE-SIC, MMSE-PIC, or Turbo-Interference Cancellation (Turbo-IC) receiver.

The methods of using the one or more parameters for mitigating interference originating from the one or more second user equipments 122 for the above receiver types will be described below in detail:

Linear Interference Suppressing Receiver.

This kind of receiver does not require much a priori information about an interferer such as one of the second user equipments 122. It simply needs to estimate an impairment covariance matrix and uses it to formulate IRC/MMSE weights to suppress interference from the one of the second user equipments 122. Such an impairment covariance matrix may be estimated non-parametrically. For example, in LTE impairment realizations may be obtained using the DMRS of the desired signal. The desired signal is the signal comprising useful information, which is intended to be received by the receiver. Then, the impairment covariance matrix may be estimated based on these impairment realizations. In CDMA, e.g. WCDMA, High Speed Packet Access (HSPA), impairment covariance matrix is estimated, quite reliably, using unused Orthogonal Variable Spreading Factor (OVSF) codes. These nonparametric approaches do not require explicit knowledge of the interferers' channel coefficients. Alternatively, an estimate of the impairment covariance matrix may be obtained parametrically based on the second user equipment's 121 channel coefficients.

For linear interference suppressing receivers, it will help to know the timing of the interfering signal of the one or more second user equipments 122. Thus, the first user equipment 121 gets the idea about the time window in which the interference characteristics stay the same. To facilitate timing estimation, it is helpful if the receiver of the first user equipment 121 is informed of the scrambling code for HS or DMRS for LTE, used by the interfering transmitter of the one or more second user equipments 122. For the nonparametric approach, the received one or more parameters may comprise timing of one or more interference signal. For the parametric approach, the received one or more parameters may further comprise one or more out of: signal pattern, information about reference symbols, number of layers, precoder matrix used for each layer, or scrambling code information in the case of CDMA interferer.

Nonlinear, Subtractive-Type of Interference Cancellation Receiver.

This type of receiver is more effective in suppressing interference than the first type, but it requires more information, i.e. more of the one or more parameters. It definitely needs to know the scrambling code in the case of CDMA, or DMRS. This knowledge enables pilot subtraction; thus interference contributed by the pilot symbols may be cancelled. This knowledge also allows the channel coefficients of the interference signal to be estimated by the first user equipment 121. Then, the receiver may be also informed of modulation and coding scheme. With this information and estimated interference signal channel coefficients, the receiver of the first user equipment 121, may attempt to decode the interfering signal. After the information bits in the interference signal are detected, the first user equipment may regenerate the interference signal. There are two options in regenerating the interference signal. First, if the detected information bits in the interference signal pass Cyclic Redundancy Check (CRC), the detected information bits are deemed correct. Then, hard modulation symbols may be used in regenerating the interference signal. This is done through encoding the detected information bits using the interference signal's coding scheme and modulating the encoded bits using the interference signal's modulation format. On the other hand, if the CRC check fails, the decoder that is used to decode the interfering signal generates soft encoded bit log-likelihood ratios, which may be used to generate soft modulated symbols. Regardless whether hard symbols or soft symbols are regenerated, an estimate of the received version of the interference signal may be obtained by perform channel filtering on these regenerated symbols. In the case of CDMA, additional spreading and scrambling steps are needed before channel filtering.

Figure 5:
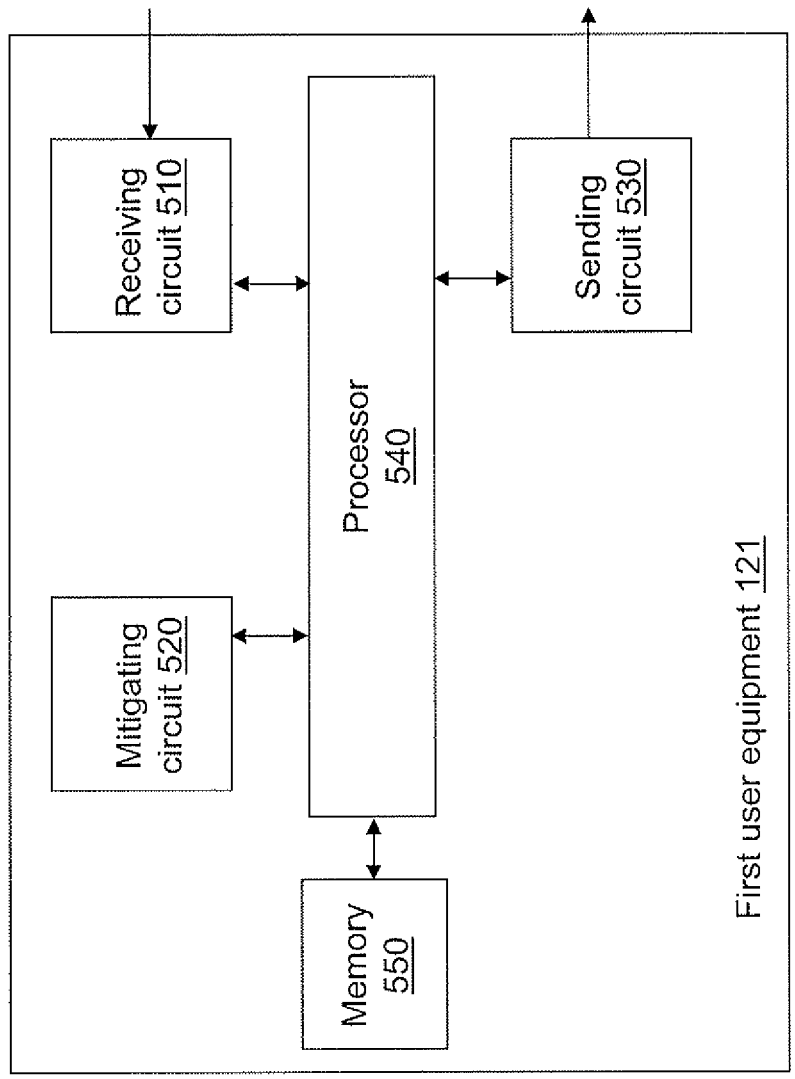
FIG. 5 is a schematic block diagram illustrating embodiments of a first user equipment.

To perform the method actions for mitigating interference described above in relation to FIG. 4, the first user equipment 121 comprises the following arrangement depicted in FIG. 5. As mentioned above the first user equipment 121 is adapted to be served by the network node 110 comprised in the cellular communications network 100. The cellular communications network 100 further is adapted to comprise the first user equipment 121 and the second user equipment 122. The second user equipment 122 is adapted to cause interference to the first user equipment 121 when at least one of the first user equipment 121 and the second user equipment 122 communicate by using D2D communication. The second user equipment 122 may comprise one or more second user equipments 122.

The first user equipment 121 comprises a receiving circuit 510 configured to receive one or more parameters from the network node 110. The one or more parameters relate to information about a receiver of the first user equipment 121 and to the interfering second user equipment 122.

The information about the receiver may comprise receiver type and/or algorithms used by the first user equipment 121 for mitigating interference caused by the second user equipment 122.

The received one or more parameters may comprise one or more out of: timing of interference signal, transport format, signal pattern, information about reference symbols, transmit power, number of layers, precoder matrix used for each layer, antenna configuration, scrambling code information, scheduling, or the number of second user equipments 122 that causes interference to the first user equipment 121.

The received one or more parameters may be used for determining which one or more second user equipments 122 that are causing interference to the first user equipment 121 and their respective corresponding interference level. The one or more parameters may further be used for selecting the type of receiver to be used, in order to perform the mitigation.

In some embodiments, the one or more parameters further relate to information about radio operational parameters in the cellular communications network 100 and/or location of one or more second user equipments 122 and/or radio measurements performed by the one or more second user equipments 122. The radio operational parameters may relate to one or more out of: network synchronization, cell size and cell load.

The received one or more parameters may be associated with one or more specific channels causing the interference.

The first user equipment 121 further comprises a mitigating circuit 520 configured to mitigate the interference caused by the second user equipment 122 according to the one or more parameters received from the network node 110.

The mitigating circuit 520 may further be configured to mitigate the interference by suppressing, reducing, eliminating or cancelling said interference.

The first user equipment 121 further comprises a sending circuit 530 which may be configured to send information to the network node 110. The information comprises that the first user equipment 121 has capability of mitigating interference.

In some embodiments, the sending circuit 530 further is configured to send information to the network node 110, information about the receiver of the first user equipment 121.

The embodiments herein for mitigating interference may be implemented through one or more processors, such as a processor 540 in the first user equipment 121 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the first user equipment 121. One such carrier may be in the form of a CD ROM disc. It is however feasible with other data carriers such as a memory stick. The computer program code may furthermore be provided as pure program code on a server and downloaded to the first user equipment 121.

The first user equipment 121 may further comprise a memory 550 comprising one or more memory units. The memory 550 is arranged to be used to store the one or more parameters, information about which one or more second user equipments 122 that are causing interference to the first user equipment 121 and their respective corresponding interference level, power levels, data and/or control channels, type of signals, configurations, schedulings, and applications, to perform the methods herein when being executed in the first user equipment 121.

Those skilled in the art will also appreciate that the receiving circuit 510, the mitigating circuit 520 and the sending circuit 530 described above may refer to a combination of analog and digital circuits, and/or one or more processors configured with software and/or firmware, e.g. stored in a memory such as the memory 550, that when executed by the one or more processors such as the processor 540 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for assisting a first user equipment in interference mitigation, which network node is comprised in a cellular communications network, which cellular communications network further comprises the first user equipment and a second user equipment, which second user equipment causes interference to the first user equipment when the first user equipment communicates by using Device-to-Device (D2D) communication, the method comprising:
    obtaining information about a receiver of the first user equipment;
    determining at least one parameter usable by the first user equipment for selecting a receiver type, when the first user equipment is using D2D communication and comprises more than one receiver that supports D2D communication, and algorithm for mitigating the interference caused by the second user equipment, which at least one parameter relates to the obtained information and to the interfering second user equipment, the at least one parameter including a timing of an interference signal; and
    sending the at least one parameter to the first user equipment thereby assisting the first user equipment to mitigate the interference caused by the second user equipment.

2. The method according to claim 1, further comprising receiving from the first user equipment, information that the first user equipment has capability of mitigating interference.

3. The method according to claim 1, wherein the information about the receiver comprises at least one of receiver type and algorithms used by the first user equipment for mitigating the interference caused by the second user equipment.

4. The method according to claim 1, wherein obtaining the information about the receiver is performed explicitly by receiving the information from the first user equipment.

5. The method according to claim 1, wherein obtaining the information about the receiver is performed implicitly by deriving the information from one of the first user equipment reported radio measurements and performance indicators.

6. The method according to claim 1, further comprising obtaining information about at least one of a location of the second user equipment and radio measurements performed by the second user equipment, and wherein determining the at least one parameter further is based on at least one of (a) the location of the second user equipment, (b) relative location between the second user equipment and the first user equipment and (c) radio measurements performed by the first user equipment on signals transmitted by the second user equipment.

7. The method according to claim 6, wherein the cellular communications network further comprises a plurality of user equipments including the second user equipment, and wherein the determining the at least one parameter further comprises determining which of the plurality of user equipments are causing the interference to the first user equipment.

8. The method according to claim 1, further comprising obtaining information about radio operational parameters in the cellular communications network, and wherein the determining the at least one parameter is further based on the radio operational parameters in the cellular communications network.

9. The method according to claim 8, wherein the radio operational parameters relate to at least one of: network synchronization, cell size and cell load.

10. The method according to claim 1, wherein the determined at least one parameter further comprises at least one of: transport format, signal pattern, information about reference symbols, number of layers, precoder matrix used for each layer, antenna configuration, Code Division Multiple Access (CDMA) channelization code, scrambling code information, information related to scheduling and information related to configuration of physical signals.

11. The method according to claim 1, further comprising:
performing one of a radio operation task and a Radio Resource Management (RRM) action based on the interference being mitigated by the first user equipment.

12. The method according to claim 1, further comprising forwarding the information about the receiver of the first user equipment to a second network node.

13. The method according to claim 1, wherein the at least one parameter is associated with at least one of (a) at least one specific channel and (b) physical signals causing the interference.

14. A method in a first user equipment for mitigating interference, which first user equipment is served by a network node comprised in a cellular communications network, which cellular communications network further comprises the first user equipment and a second user equipment, which second user equipment causes interference to the first user equipment when the first user equipment communicates by using Device-to-Device (D2D) communication, the method comprising:
receiving at least one parameter from the network node, which at least one parameter relates to information about a receiver of the first user equipment and to the interfering second user equipment, the at least one parameter including a timing of an interference signal; and
selecting a receiver type, when the first user equipment is using D2D communication and comprises more than one receiver that supports D2D communication, and algorithm for mitigating the interference caused by the second user equipment according to the at least one parameter received from the network node.

15. The method according to claim 14, further comprising sending information to the network node, which information comprises that the first user equipment has capability of mitigating interference.

16. The method according to claim 15, wherein the sending information to the network node further comprises sending information about the receiver of the first user equipment.

17. The method according to claim 16, wherein the information about the receiver comprises at least one of receiver type and algorithms used by the first user equipment for mitigating the interference caused by the second user equipment.

18. The method according to claim 14, wherein mitigating the interference caused by the second user equipment comprises at least one of suppressing, reducing, eliminating and canceling said interference.

19. The method according to claim 14, wherein the received at least one parameter further comprises at least one of: transport format, signal pattern, information about reference symbols, number of layers, precoder matrix used for each layer, antenna configuration, scrambling code information, scheduling, and a number of a plurality of user equipments including the second user equipment that causes interference to the first user equipment.

20. The method according to claim 14, wherein the cellular communications network further comprises a plurality of user equipments including the second user equipment, wherein the received at least one parameter is further used for determining which of at least one of the plurality of user equipments are causing interference to the first user equipment and the respective corresponding interference level of the at least one of the plurality of user equipments that are causing the interference.

21. The method according to claim 14, wherein the at least one parameter further relates to at least one of (a) at least one of information about radio operational parameters in the cellular communications network and location of the second user equipment and (b) radio measurements performed by the second user equipment.

22. The method according to claim 21, wherein the radio operational parameters relate to at least one of: network synchronization, cell size and cell load.

23. The method according to claim 14, wherein the received at least one parameter is associated with at least one of (a) at least one specific channel and (b) physical signals causing the interference.

24. A network node for assisting a first user equipment in interference mitigation, which network node is configured to be included in a cellular communications network, which cellular communications network further is configured to include the first user equipment and a second user equipment, which second user equipment is configured to cause interference to the first user equipment when the first user equipment communicates by using Device-to-Device (D2D) communication, the network node comprising:

an obtaining circuit configured to obtain information about a receiver of the first user equipment;

a determining circuit configured to determine at least one parameter useable by the first user equipment for selecting a receiver type, when the first user equipment is using D2D communication and comprises more than one receiver that supports D2D communication, and algorithm for mitigating the interference caused by the second user equipment, which at least one parameter relates to the obtained information and to the interfering second user equipment, the at least one parameter including a timing of an interference signal; and a sending circuit configured to send the at least one parameter to the first user equipment thereby assisting the first user equipment to mitigate the interference caused by the second user equipment.

25. The network node according to claim 24, further comprising a receiving circuit configured to receive from the first user equipment, information that the first user equipment has capability of mitigating interference.

26. The network node according to claim 24, wherein the information about the receiver comprises at least one of receiver type and algorithms adapted to be used by the first user equipment for mitigating the interference caused by the second user equipment.

27. The network node according to claim 24, wherein the obtaining circuit further is configured to obtain the information about the receiver explicitly by receiving the information about the receiver from the first user equipment.

28. The network node according to a claim 24, wherein the obtaining circuit further is configured to obtain the information about the receiver implicitly by deriving the information about the receiver from one of first user equipment reported radio measurements and performance indicators.

29. The network node according to claim 24, wherein the obtaining circuit further is configured to obtain information about at least one of the location of the second user equipment and radio measurements performed by the second user equipment, and wherein the determining circuit is configured to determine the at least one parameter further based on at least one of (a) the location of the second user equipment, (b) relative location between the second user equipment and the first user equipment and (c) radio measurements performed by the first user equipment on signals transmitted by the second user equipment.

30. The network node according to claim 29, wherein the cellular communications network is further configured to include a plurality of user equipments including the second user equipment, and wherein the determining circuit is configured to determine the at least one parameter by determining which of at least one of the plurality of user equipments are causing interference to the first user equipment.

31. The network node according to claim 30, wherein the obtaining circuit further is configured to obtain information about radio operational parameters in the cellular communications network, and wherein the determining circuit is configured to determine the at least one parameter further based on the radio operational parameters in the cellular communications network.

32. The network node according to claim 31, wherein the radio operational parameters relate to at least one of: network synchronization, cell size and cell load.

33. The network node according to claim 24, wherein the at least one parameter further comprises at least one of: transport format, signal pattern, information about reference symbols, number of layers, precoder matrix used for each layer, antenna configuration, Code Division Multiple Access, CDMA, channelization code, scrambling code information, information related to scheduling and information related to configuration of physical signals.

34. The network node according to claim 24, further comprising:

a performing circuit configured to perform one of a radio operation task and an Radio Resource Management (RRM) action based on that the interference is mitigated by the first user equipment.

35. The network node according to claim 24, further comprising:

a forwarding circuit configured to forward the information about the receiver of the first user equipment to a second network node.

36. The network node according to claim 24, wherein the determined at least one parameter is associated with at least one of (a) at least one specific channel and (b) physical signals causing the interference.

37. A first user equipment for mitigating interference, which first user equipment is configured to be served by a network node in a cellular communications network, which cellular communications network further is configured to include the first user equipment and a second user equipment, which second user equipment is configured to cause interference to the first user equipment when the first user equipment communicates by using Device-to-Device (D2D) communication, the first user equipment comprising:

a receiving circuit configured to receive at least one parameter from the network node, which at least one parameter relates to information about a receiver of the first user equipment and to the interfering second user equipment, the at least one parameter including a timing of an interference signal; and a mitigating circuit configured to select a receiver type, when the first user equipment is using D2D communication and comprises more than one receiver that supports D2D communication, and algorithm to mitigate the interference caused by the second user equipment according to the at least one parameter received from the network node.

38. The first user equipment according to claim 37, further comprising a sending circuit configured to send information to the network node, which information comprises that the first user equipment has capability of mitigating interference.

39. The first user equipment according to claim 37, wherein the mitigating circuit is configured to mitigate the interference caused by the second user equipment by one of suppressing, reducing, eliminating and cancelling said interference.

40. The first user equipment according to claim 37, wherein the sending circuit further is configured to send to the network node, information about the receiver of the first user equipment.

41. The first user equipment according to claim 40, wherein the information about the receiver comprises at least one of receiver type and algorithms used by the first user equipment for mitigating the interference caused by the second user equipment.

42. The first user equipment according to claim 37, wherein the received at least one parameter further comprises at least one of: transport format, signal pattern, information about reference symbols, number of layers, precoder matrix used for each layer, antenna configuration, scrambling code information, scheduling, and a number of a plurality of user equipments including the second user equipment that causes interference to the first user equipment.

43. The first user equipment according to claim 37, wherein the cellular communications network is further configured to include a plurality of user equipments including the second user equipment, and wherein the received at least one parameter is further used for determining which of the plurality of user equipments are causing interference to the first user equipment and respective corresponding interference levels of the plurality of user equipments causing interference.

44. The first user equipment according to claim 37, wherein the at least one parameter further relates to at least one of (a) information about radio operational parameters in the cellular communications network, (b) location of the second user equipment and (c) radio measurements performed by the second user equipment.

45. The first user equipment according to claim 44, wherein the radio operational parameters relate to at least one of: network synchronization, cell size and cell load.

46. The first user equipment according to claim 37, wherein the received at least one parameter is associated with at least one of (a) at least one specific channel and (b) physical signals causing the interference.

* * * * *